US012460797B1

(12) United States Patent
Tsai

(10) Patent No.: US 12,460,797 B1
(45) Date of Patent: Nov. 4, 2025

(54) CHRISTMAS TREE SNAP-FIT LAMP BODY

(71) Applicant: Yu Chi Tsai, Hong Kong (CN)

(72) Inventor: Yu Chi Tsai, Hong Kong (CN)

( * ) Notice: Subject to any disclaimer, the term of this patent is extended or adjusted under 35 U.S.C. 154(b) by 0 days.

(21) Appl. No.: 18/909,112

(22) Filed: Oct. 8, 2024

(51) Int. Cl.

| | |
|---|---|
| ***F21V 19/00*** | (2006.01) |
| ***F21S 4/10*** | (2016.01) |
| ***F21V 19/04*** | (2006.01) |
| ***F21V 23/00*** | (2015.01) |
| ***F21V 23/06*** | (2006.01) |
| ***H05B 45/38*** | (2020.01) |
| *F21Y 115/10* | (2016.01) |

(52) U.S. Cl.
CPC .............. *F21V 19/004* (2013.01); *F21S 4/10* (2016.01); *F21V 19/04* (2013.01); *F21V 23/002* (2013.01); *F21V 23/06* (2013.01); *H05B 45/38* (2020.01); *F21Y 2115/10* (2016.08)

(58) Field of Classification Search
CPC ...... F21V 19/004; F21V 19/04; F21V 23/002; F21V 23/06; F21S 4/10; H05B 45/38; F21Y 2115/10
See application file for complete search history.

(56) References Cited

U.S. PATENT DOCUMENTS 12,085,244 B1 * 9/2024 Tsai ........................ F21V 23/06
2008/0200074 A1 * 8/2008 Tsai .................... F21V 19/0005 439/692
2013/0078847 A1 * 3/2013 Chen .................. F21V 19/0025 439/620.02
2015/0204524 A1 * 7/2015 Pan .................... F21V 19/0025 313/318.01
2015/0211727 A1 * 7/2015 Loomis ..................... F21V 3/02 362/375
2015/0233562 A1 * 8/2015 Chiang ................. F21V 23/005 362/249.06
2024/0302006 A1 * 9/2024 Chow ..................... F21V 23/06
2025/0052410 A1 * 2/2025 Yang ....................... F21V 23/06

* cited by examiner

*Primary Examiner* — Evan P Dzierzynski
(74) *Attorney, Agent, or Firm* — Birchwood IP

(57) ABSTRACT

Disclosed is a Christmas tree snap-fit lamp body, including a lampshade having an opening on a lower side and hollow inside, a light-emitting diode placed inside the lampshade, a soft core and a snap-fit shell each having a channel that penetrates through from top to bottom, a lower end of the lampshade is inserted into the channel inside the soft core, a lower end of the soft core is inserted into the snap-fit shell, and both sides of inner walls of the snap-fit shell are provided with electrode sheets; and pins of the light-emitting diode pass through the lower side of the lampshade to be connected to the electrode sheets, a polar plate is arranged inside the channel of the soft core, the two pins of the light-emitting diode are separated by the polar plate, and a fixing clamp is arranged on an outer wall of the snap-fit shell.

11 Claims, 11 Drawing Sheets

1

6

8

9

CHRISTMAS TREE SNAP-FIT LAMP BODY

TECHNICAL FIELD

The present disclosure relates to the field of Christmas lamps, and particularly relates to a Christmas tree snap-fit lamp body.

BACKGROUND

A Christmas light string, as a holiday decorative item, is widely used in various scenarios. It can be arranged along a headboard, a windowsill or a ceiling to create a warm and romantic atmosphere. During holidays, decoration by the Christmas light string in a store window often attracts customers. The Christmas light string can be applied in a variety of scenarios, and can play unique decorative effects for home decoration, holiday celebration, commercial venues, outdoor landscapes, or event sites. However, the current Christmas tree light structure needs to be improved in many aspects in terms of design and usage.

Wires of a traditional Christmas light string are prone to aging and breaking, and connections thereof are easy to loosen. Improving wire material and connection structure, such as using more durable wires and more secure connection methods, can prolong a service life of the light string. Furthermore, the traditional Christmas light string is cumbersome in installation and removal, requiring lots of time and efforts. When installing a traditional tree, a worker needs to make great efforts to wrap the wires around branches and leaves of a Christmas tree, therefore, it is necessary to improve a structure of the light string to make it easier to be installed and removed; moreover, when one bulb of the light string is damaged, it is often necessary to replace or remove the entire light string for repair. Improving a maintenance and replacement mechanism, such as adopting a modular design or an individually replaceable bulb, can reduce maintenance costs and improve usage efficiency.

In summary, the current Christmas light string structure has considerable room for improvement in terms of safety, durability, convenience, and functionality. Therefore, how to design a Christmas tree snap-fit lamp body with stable connections and convenient replacement of accessories has become an urgent problem that needs to be solved by those skilled in the art.

SUMMARY

An objective of the present disclosure is to provide a Christmas tree snap-fit lamp body so as to solve the problems mentioned in the background art.

In order to achieve the foregoing objective, the present disclosure adopts the following technical solution:

a Christmas tree snap-fit lamp body, which includes a lampshade, a light-emitting diode, a soft core, and a snap-fit shell, where the lampshade is provided with an opening on a lower side and hollow inside, each of the soft core and the snap-fit shell is provided with a channel that penetrates through from top to bottom, a lower end of the lampshade is inserted and connected into the channel inside the soft core, a lower end of the soft core is inserted and connected into the snap-fit shell, and both sides of inner walls of the snap-fit shell are provided with electrode sheets that are respectively connected to external connecting wires; the light-emitting diode is placed inside the lampshade, pins of the light-emitting diode pass through the lower side of the lampshade and through the channel inside the soft core to be connected to the electrode sheets, a polar plate is arranged inside the channel of the soft core, the two pins of the light-emitting diode are separated by the polar plate to avoid circuit failure caused by contact with the two pins, a fixing clamp is arranged on an outer wall of the snap-fit shell, and the fixing clamp can be fixed to tree leaves of a branch of a Christmas tree to improve the stability of connections between the lamp body and the tree leaves.

Further, an outer wall of a bottom end of the lampshade is provided with a first protruding ring, and a second protruding ring corresponding to the first protruding ring is arranged on an inner wall of the channel inside the soft core; and when the lower end of the lampshade is inserted into the first protruding ring, the first protruding ring and the second protruding ring form a limiting snap-fit connection to prevent the lampshade from detaching from the soft core.

Further, a soft connection wall and a shoulder are arranged at the lower end of the soft core, and the shoulder is located at an upper end of the soft connection wall.

Further, a soft connection groove and a recess corresponding to the soft connection wall and the shoulder are arranged in the channel inside the snap-fit shell; and when the soft connection wall is inserted into the soft connection groove and downward to a predetermined depth, the shoulder is in contact with the recess, limiting an insertion depth of the soft core into the channel inside the snap-fit shell.

Further, when the soft connection wall is inserted into the soft connection groove, and the shoulder is in contact with the recess, the two pins are respectively connected to the electrode sheets on the inner walls of both sides of the snap-fit shell.

Further, a flexible connecting rod is arranged on an outer wall of the soft core, and the flexible connecting rod can be bent and rotated.

Further, a snap-fit slot is formed on the outer wall of the snap-fit shell; and when the soft connection wall is inserted into the soft connection groove to the predetermined depth, the flexible connecting rod can be bent downward and is snapped into the snap-fit slot.

Further, a slot is formed on each of the inner walls of the snap-fit shell, the slots and the soft connection groove are arranged alternately on the inner wall of the snap-fit shell, the electrode sheets are inserted from a lower side of the snap-fit shell and pass through the channel inside the snap-fit shell, and then pulled down along the inner walls of the snap-fit shell to be snapped into the slots, the electrode sheets are fixed to the slots, and positions of the pins correspond to the electrode sheets.

Further, the lampshade is made from transparent material; and when the light-emitting diode inside the lampshade is lighted up, external surroundings can be accordingly illuminated via the lampshade.

Further, a number of the electrode sheets is two, which are respectively connected to the external connecting wires, such that a plurality of the lamp bodies are connected to form a light string.

Further, the light string is composed of the plurality of the lamp bodies that are connected in series, an end of the light string is provided with a power plug, a main body of the Christmas tree is provided with a plurality of sockets that are connected in parallel, and each of the sockets is connected to the power plug.

Further, the power plug of the light string is further provided with a boost circuit, and the boost circuit can boost a voltage to make voltages of the lamp bodies of the light string normal.

Compared with the prior art, the present disclosure has the following beneficial effects:

The present disclosure provides a Christmas tree snap-fit lamp body, an exterior of the lamp body is mainly composed of three parts: the lampshade, the soft core, and the snap-fit shell, where the lampshade, the soft core, and snap-fit shell are connected in sequence, the three parts are all hallow and interconnected internally, a light-emitting diode is fixed inside the lampshade, the electrode sheets are fixed inside the snap-fit shell, the positive and negative terminals of the pins of the light-emitting diode are respectively connected to the electrode sheets, the light-emitting diode and the electrode sheets are enclosed with the lampshade, and the soft core, and the snap-fit shell to provide protective, dustproof and waterproof effects; the flexible connecting rod is arranged on an outer wall of the soft core, the snap-fit slot is formed on the outer wall of the snap-fit shell, and the flexible connecting rod can be bent downward and is snapped into the snap-fit slot, which not only enhances the connection between the flexible connecting rod and the soft core, but also prevents the positive and negative terminals of the pins of the light-emitting diode from being connected in reverse to the electrode sheets; the polar plate is arranged inside the channel of the soft core, the two pins are separated by the polar plate to avoid circuit failure caused by contact of the positive and negative terminals of the two pins; the fixing clamp is arranged on the outer wall of the snap-fit shell, the fixing clamp can be fixedly connected to the tree leaves of the branch of the Christmas tree to improve the stability of connections between the lamp body and the tree leaves; and when the plurality of the lamp bodies are connected, the fixing clamp can secure each of the lamp bodies in place to facilitate decoration. In addition to being used for the Christmas trees, the present disclosure can also be used for rattan nets, shelves, walls, and the like. Moreover, the present disclosure is more convenient to assemble and has a more beautiful appearance than traditional lamp bodies during production and assembly, and can cut down labor costs. In summary, the present disclosure features strong connection stability and convenient assembly and disassembly of accessories.

REFERENCE NUMERALS IN THE ACCOMPANYING DRAWINGS

Figure 1:
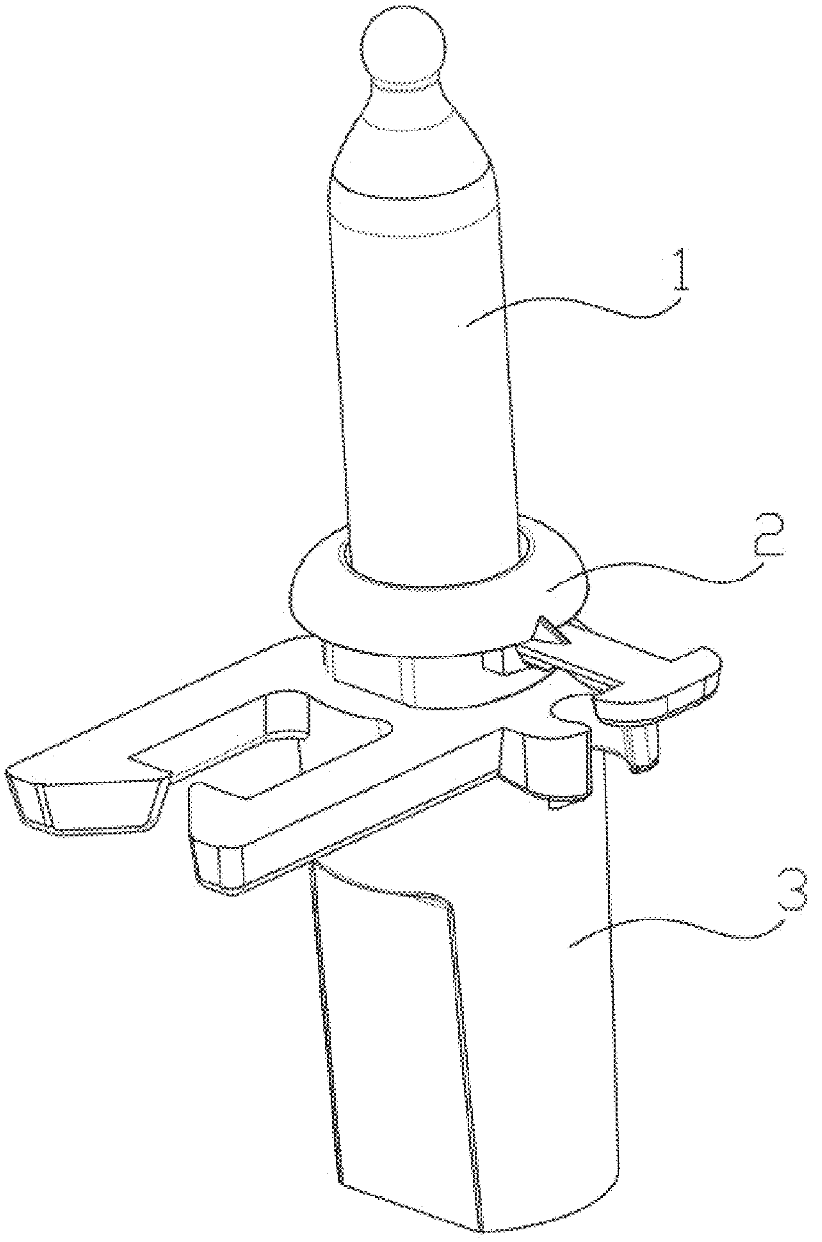
FIG. 1 is a schematic diagram of a three-dimensional structure of a Christmas tree snap-fit lamp body according to the present disclosure.

1. lampshade;
11. first protruding ring;
2. soft core;
21. flexible connecting rod;
22. polar plate;
23. perforation;
24. second protruding ring;
25. soft connection wall;
26. shoulder;
13. snap-fit shell;
31. fixing clamp;
32. snap-fit slot;
33. slot;
34. soft connection groove;
35. recess;
4. light-emitting diode;
41. pin;
5. electrode sheet;
51. top surface;
52. first adhesive surface;
53. second adhesive surface;
6. light string;
7, branch;
8. plug;
9. socket;
10. lamp body; and
12. boost circuit.

DESCRIPTION OF EMBODIMENTS

The technical solutions in the embodiments of the present disclosure are described below clearly and comprehensively in conjunction with the accompanying drawings in the embodiments of the present disclosure. It is obvious that the embodiments described are merely a part of, not all of, embodiments of the present disclosure. All other embodiments obtained by those of ordinarily skilled in the art based on the embodiments of the present disclosure without making creative efforts fall within the scope of protection of the present disclosure.

With reference to FIGS. 1-11, a Christmas tree snap-fit lamp body is provided, it includes a lampshade 1, a light-emitting diode 4, a soft core 2, and a snap-fit shell 3, where the lampshade 1 is provided with an opening on a lower side and hollow inside, each of the soft core 2 and the snap-fit shell 3 is provided with a channel that penetrates through from top to bottom, a lower end of the lampshade 1 is inserted and connected into the channel inside the soft core 2, a lower end of the soft core 2 is inserted and connected into the snap-fit shell 3, both sides of inner walls of the snap-fit shell 3 are provided with electrode sheets 5 that are connected to an external power source, and the lamp body 10 can also be connected to a plurality of the lamp bodies 10 via external connecting lines of the electrode sheets 5 to form a light string; the light-emitting diode 4 is placed inside the lampshade 1, a perforation 23 is formed at the lower end of the soft core 2, pins 41 of the light-emitting diode 4 pass through the lower side of the lampshade 1, then pass through the perforation 23 at the bottom of the soft core 2, and are bent upward to fit against an outer wall of the soft core 2, a polar plate 22 is arranged inside the channel of the soft core 2, the channel inside the soft core 2 and the perforation 23 are partitioned by the polar plate 22, the two pins 41 of the light-emitting diode 4 are separated by the polar plate 22 to avoid circuit failure caused by contact with the two pins 41, the light-emitting diode 4 and the electrode sheets 5 are enclosed with the lampshade 1, the soft core 2, and the snap-fit shell 3 to protect the light-emitting diode 4 and the electrode sheets 5, providing dustproof and waterproof effects, a fixing clamp 31 is arranged on an outer wall of the snap-fit shell 3, the fixing clamp 31 can be fixed to tree leaves of a specific branch 7 of the Christmas tree to improve the stability of connections between the lamp body and the tree leaves, and the lampshade 1 is made from transparent material; and when the light-emitting diode 4 inside the lampshade 1 is lighted up, external surroundings can be illuminated via the lampshade 1.

Figure 2:
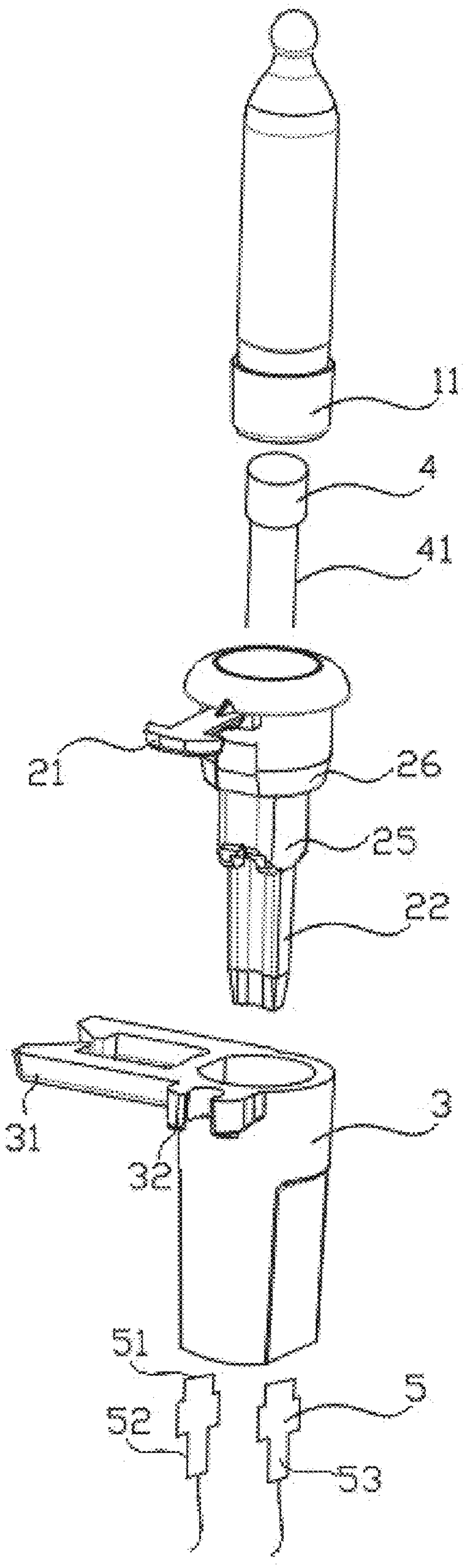
FIG. 2 is an exploded structural schematic diagram of a Christmas tree snap-fit lamp body according to the present disclosure.
Figure 4:
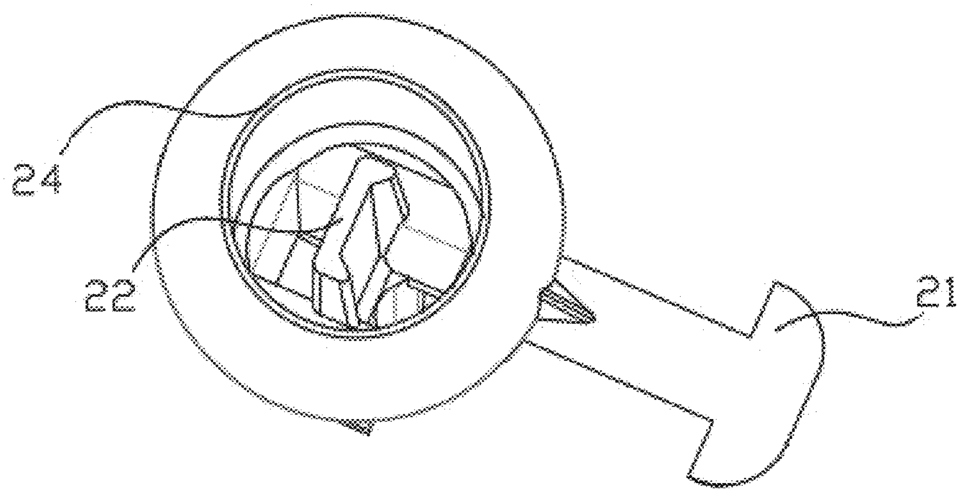
FIG. 4 is a top view of a soft core of a Christmas tree snap-fit lamp body according to the present disclosure.
Figure 5:
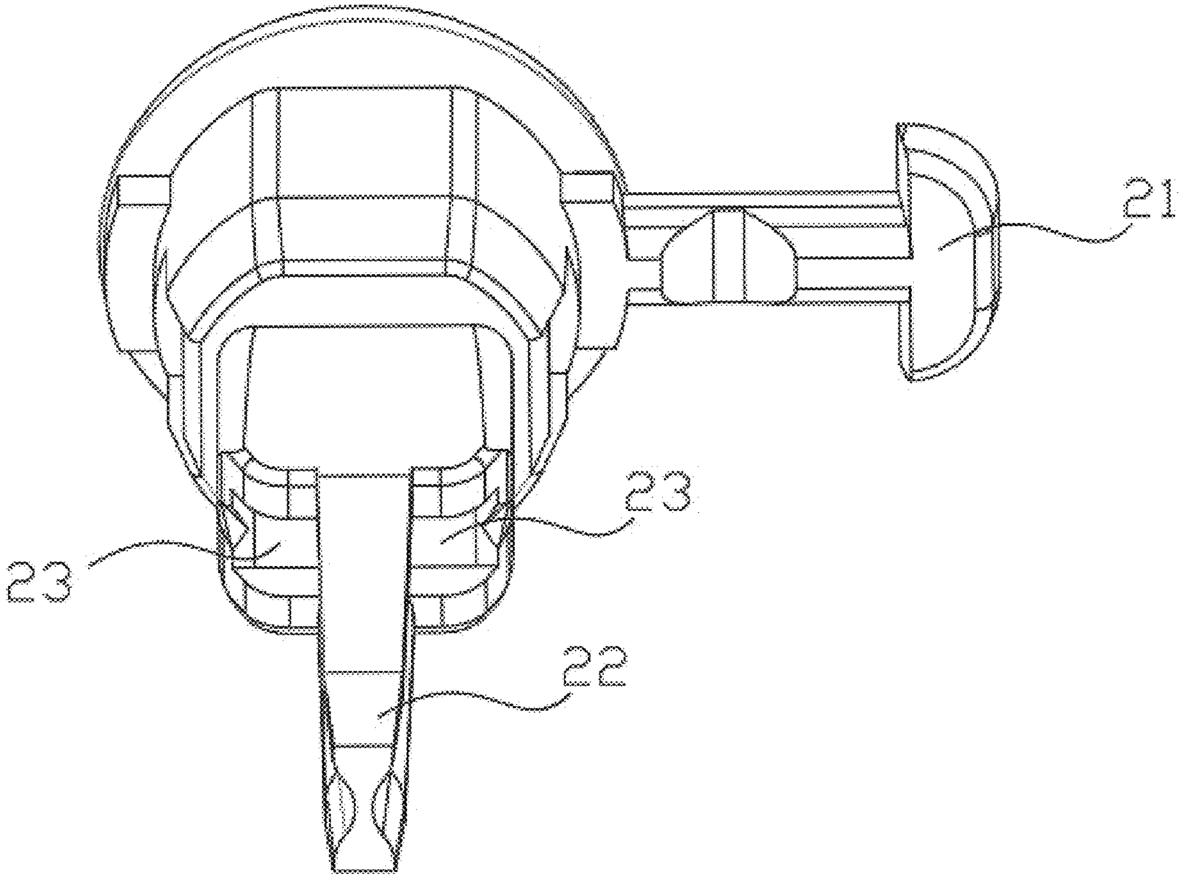
FIG. 5 is a bottom view of a soft core of a Christmas tree snap-fit lamp body according to the present disclosure.
Figure 6:
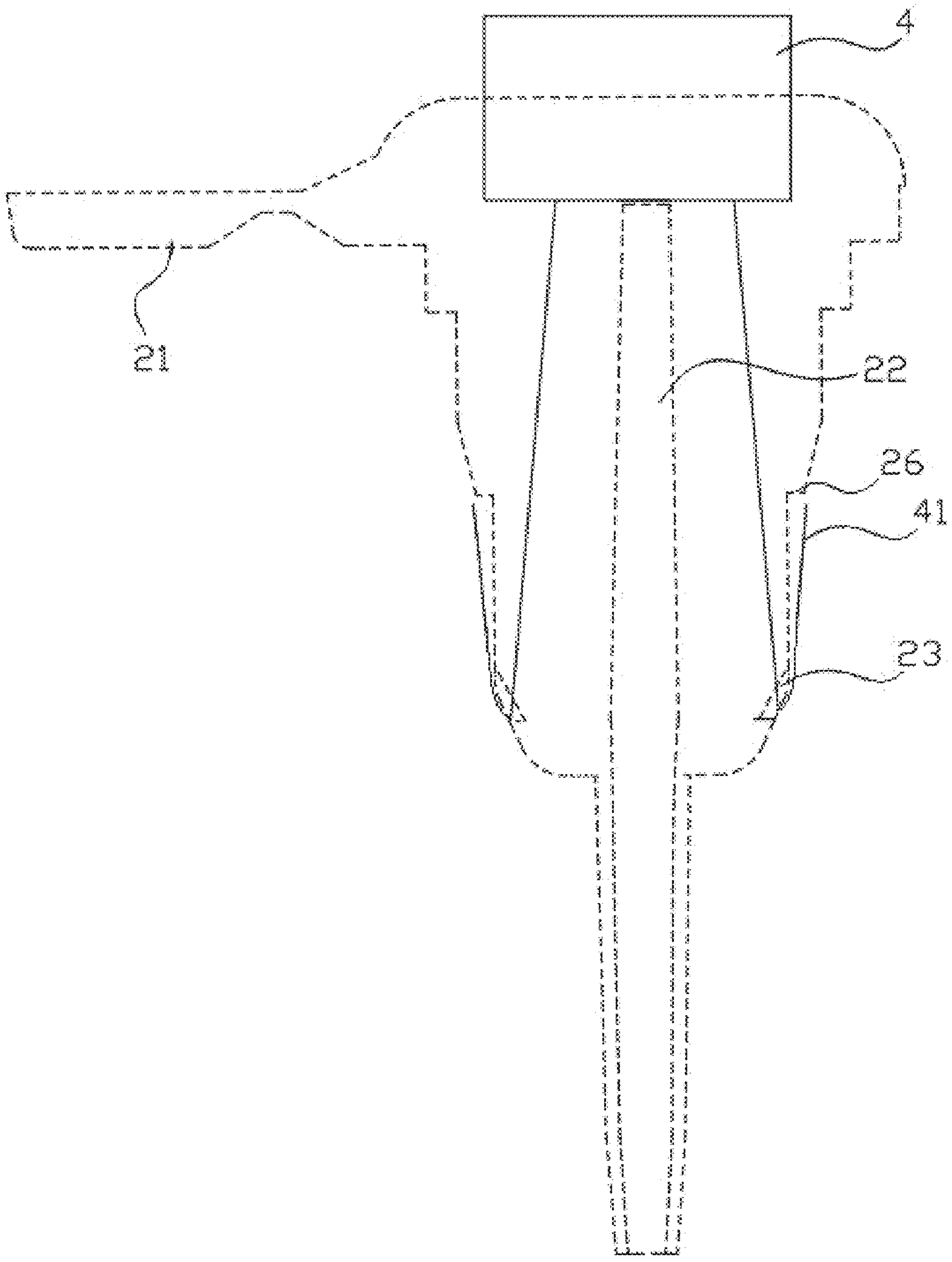
FIG. 6 is a schematic diagram of insertion of a light-emitting diode into a soft core of a Christmas tree snap-fit lamp body according to the present disclosure.
Figure 7:
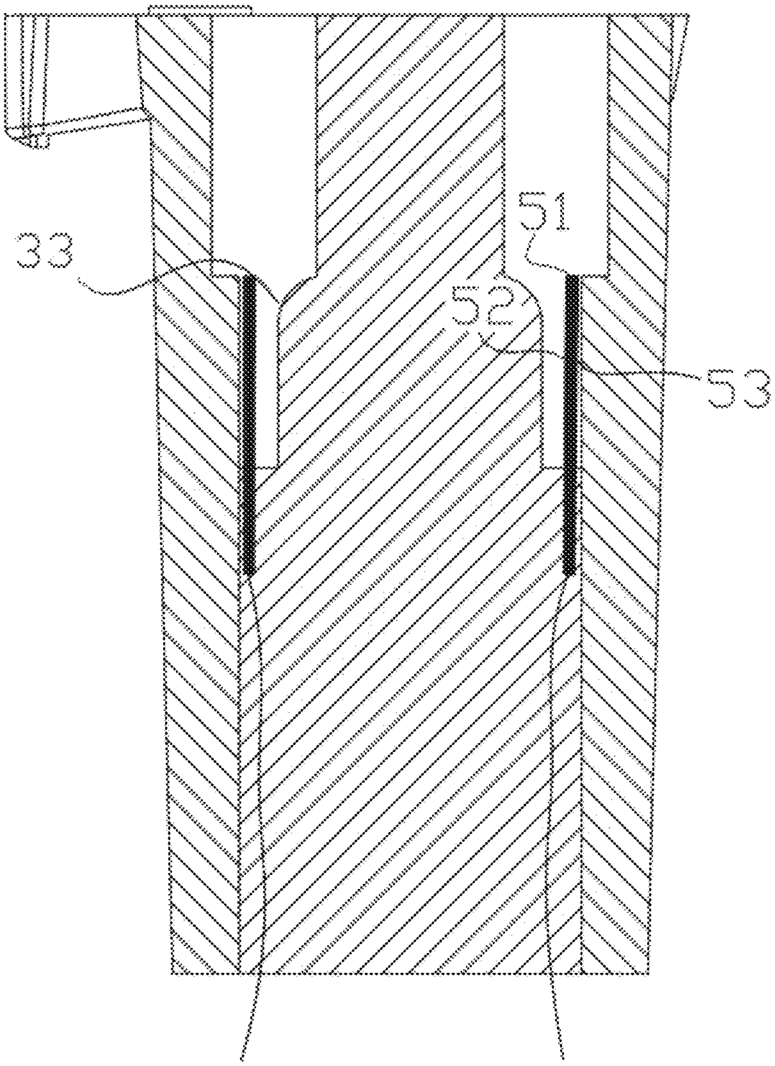
FIG. 7 is a sectional view of a snap-fit shell of a Christmas tree snap-fit lamp body according to the present disclosure.

With reference to FIGS. 2 and 4, an outer wall of a bottom end of the lampshade 1 is provided with a first protruding ring 11, and a second protruding ring 24 corresponding to the first protruding ring is arranged on an inner wall of the channel inside the soft core 2; when the lower end of the lampshade 1 is inserted into the first protruding ring 11, the first protruding ring 11 and the second protruding ring 24 form a limiting snap-fit connection to prevent the lampshade 1 from detaching from the soft core 2; and when the light-emitting diode 4 is damaged, the lampshade 1 can be detached from the soft core 2 to facilitate the replacement of the damaged light-emitting diode 4, which reduces the costs and prolongs the service life of the lamp body.

With reference to FIGS. 2, 3, 6, and 7, a soft connection wall 25 and a shoulder 26 are arranged at the lower end of the soft core 2, the shoulder 26 is located at an upper end of the soft connection wall 25, and a soft connection groove 34 and a recess 35 corresponding to the soft connection wall and the shoulder are arranged in the channel inside the snap-fit shell 3; and when the soft connection wall 25 is inserted into the soft connection groove 34 and downward to a predetermined depth, the shoulder 26 is in contact with the recess 35, limiting an insertion depth of the soft core 2 into the channel inside the snap-fit shell 3. When the soft connection wall 25 is inserted into the soft connection groove 34 and the shoulder 26 is in contact with the recess 35, and the arrangement of the shoulder 26 can control the insertion depth of the soft connection wall 25, such that the pins 41 of the light-emitting diode 4 can be fitted with the electrode sheets 5; after passing through the perforation 23 of the soft core 2, the pins 41 of the light-emitting diode 4 are bent upward to fit against the outer wall of the soft core 2; after the soft core 2 is inserted into the snap-fit shell 3, the recess 35 of the snap-fit shell 3 cooperates with the shoulder 26 of the soft core 2 to press the pins 41, such that the pins 41 are tightly connected with the electrode sheets 5, where a first adhesive surface 52 each of the electrode sheets 5 is fitted against the pins 41, a second adhesive surface 53 thereof is fitted against an inner wall of the snap-fit shell 3, and the shoulder 26 of the soft core 2 is in contact with a top surface 51 of each of the electrode sheets 5, such that the electrode sheets 5 are restricted from moving up and down in the channel inside the snap-fit shell 3, and the connection between the pins 41 and the electrode sheets 51 are more stable.

With reference to FIG. 2, a flexible connecting rod 21 is arranged on an outer wall of the soft core 2, and the flexible connecting rod 21 can be bent and rotated. A snap-fit slot 32 is formed on the outer wall of the snap-fit shell 3; when the soft connection wall 25 is inserted into the soft connection groove 34 to the predetermined depth, the flexible connecting rod 21 can be bent downward and is snapped into the snap-fit slot 32; apart from improving the stability of the connection between the soft core 2 and the snap-fit shell 3, the flexible connecting rod 21 can prevent the pins 41 of the light-emitting diode 4 from being incorrectly connected to the electrode sheets 5; since positions of the flexible connecting rod 21 and the snap-fit slot 32 are fixed, when the flexible connecting rod 21 is in correct correspondence to the snap-fit slot 32, positive and negative terminals of the pins 41 of the light-emitting diode 4 will be accordingly connected to the electrode sheets 5; and when the electrode sheets 5 are damaged, the flexible connecting rod 21 can be rotated to detach from the snap-fit slot 32, and the soft core 2 can be then pulled out from the snap-fit shell 3 to replace the damaged electrode sheets 5.

Figure 3:
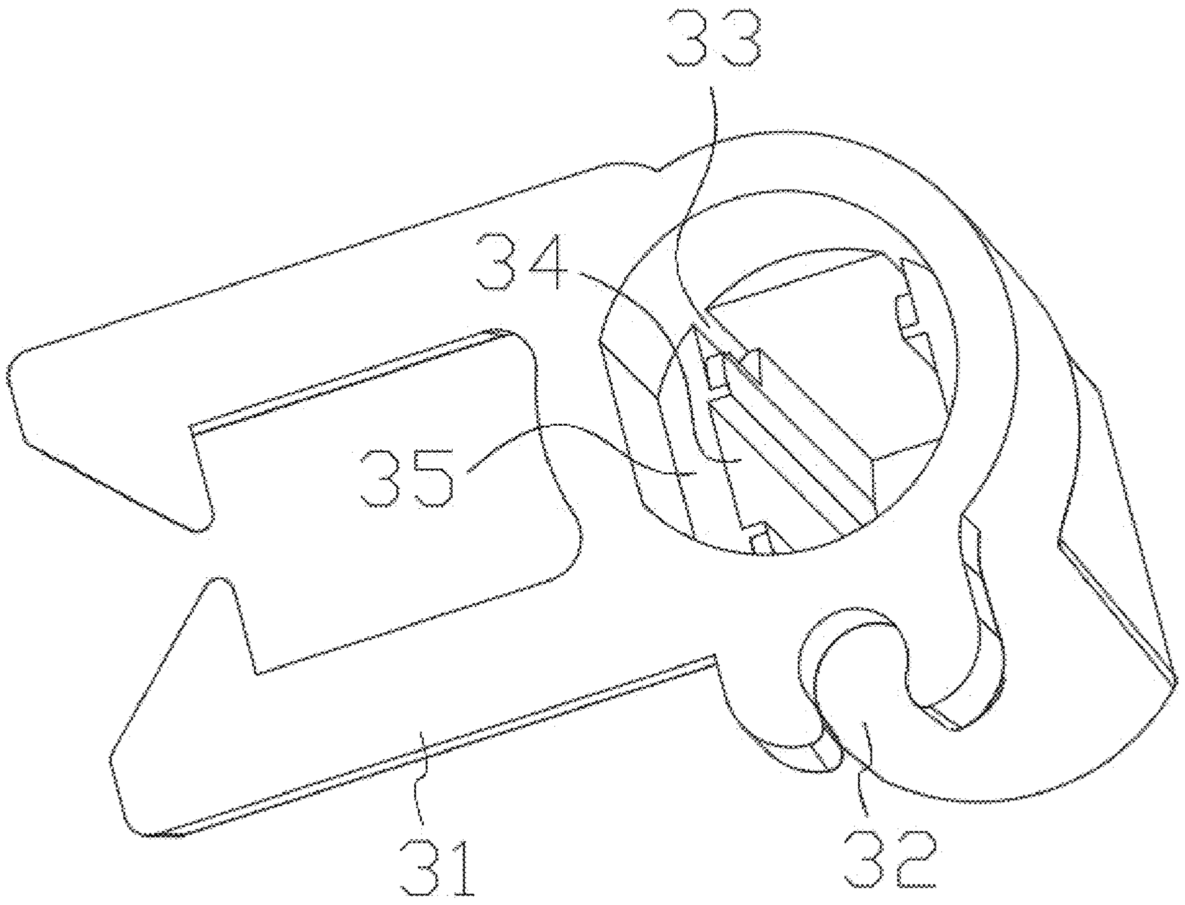
FIG. 3 is a structural schematic diagram of a snap-fit shell of a Christmas tree snap-fit lamp body according to the present disclosure.

With reference to FIG. 3, a slot 33 is formed on each of the inner walls of the snap-fit shell 3, the slots 33 and the soft connection groove 34 are arranged alternately on the inner wall of the snap-fit shell 3, the electrode sheets 5 are inserted from a lower side of the snap-fit shell 3 and pass through the channel inside the snap-fit shell 3, and then pulled down along the inner walls of the snap-fit shell 3 to be snapped into the slots 33, such that positions of the electrode sheets 5 are fixed, and positions of the pins 41 correspond to the electrode sheets 5.

Figure 8:
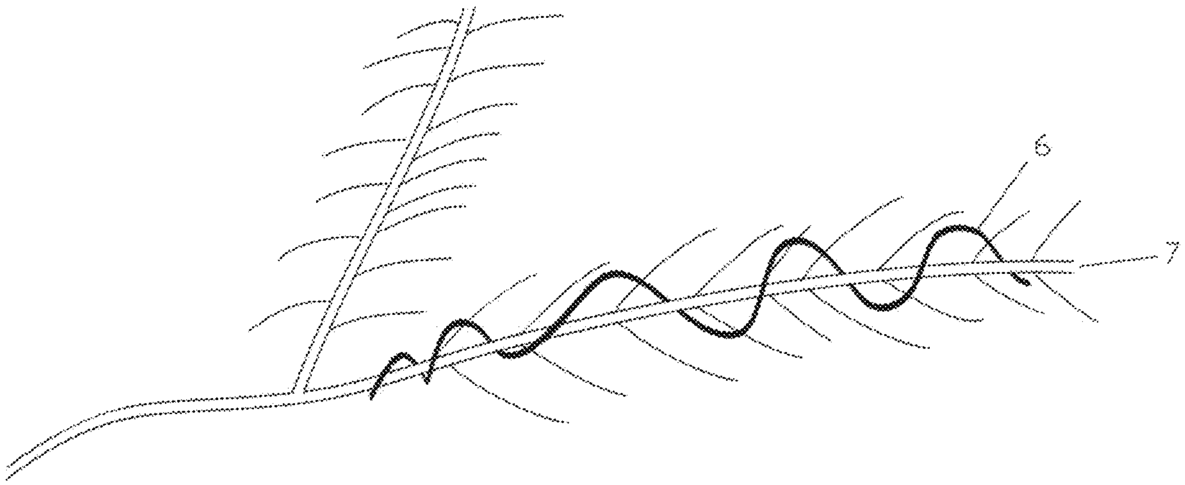
FIG. 8 is a schematic diagram of binding of a light string to a branch of a Christmas tree in the prior art.
Figure 9:
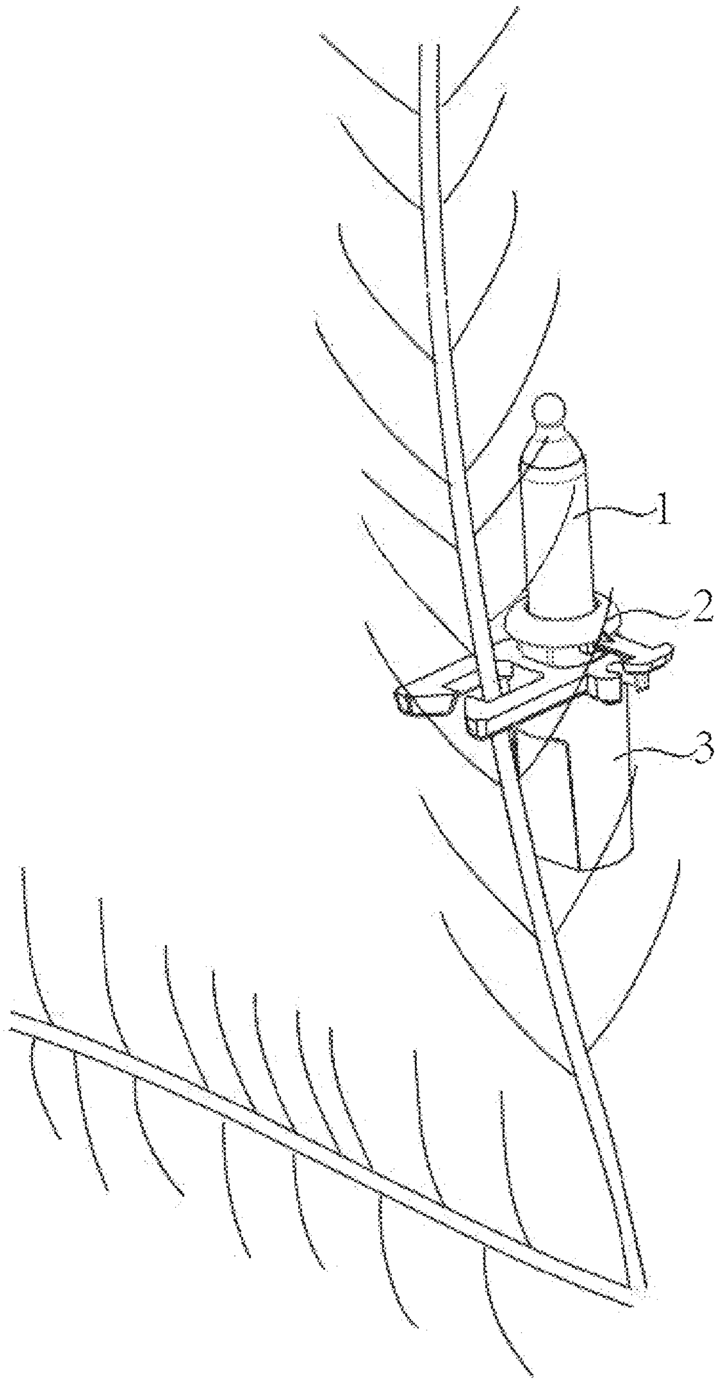
FIG. 9 is a schematic diagram of a snap-fit connection between a Christmas tree snap-fit lamp body and a branch of a Christmas tree according to the present disclosure.

With reference to FIGS. 8 and 9, an existing light string 6 is hung on the branch 7 of the Christmas tree by winding, which is easily blown off by wind in an outdoor environment; in the present disclosure, the fixing clamp 31 is used to clamp the light string to the leaves of the branch 7 of the Christmas tree to improve the connection stability.

Figure 10:
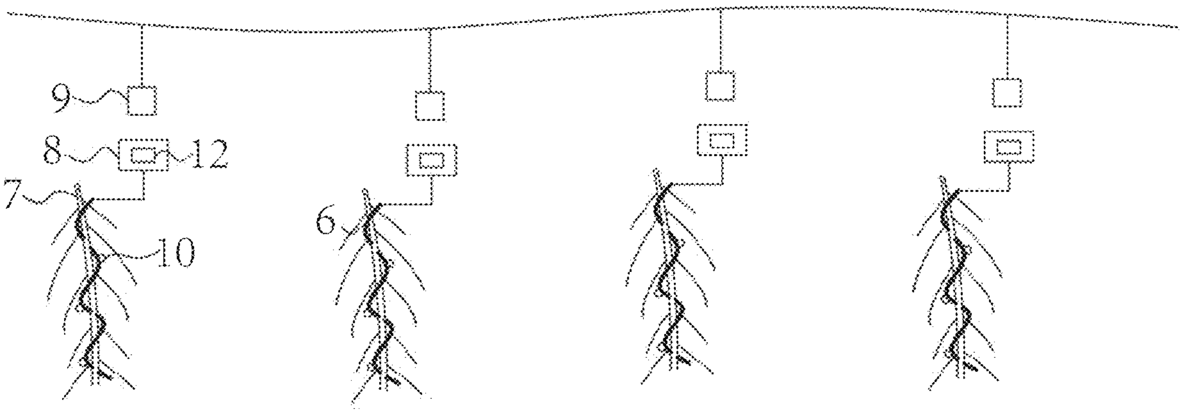
FIG. 10 is a schematic diagram of connections of light strings according to the present disclosure.
Figure 11:
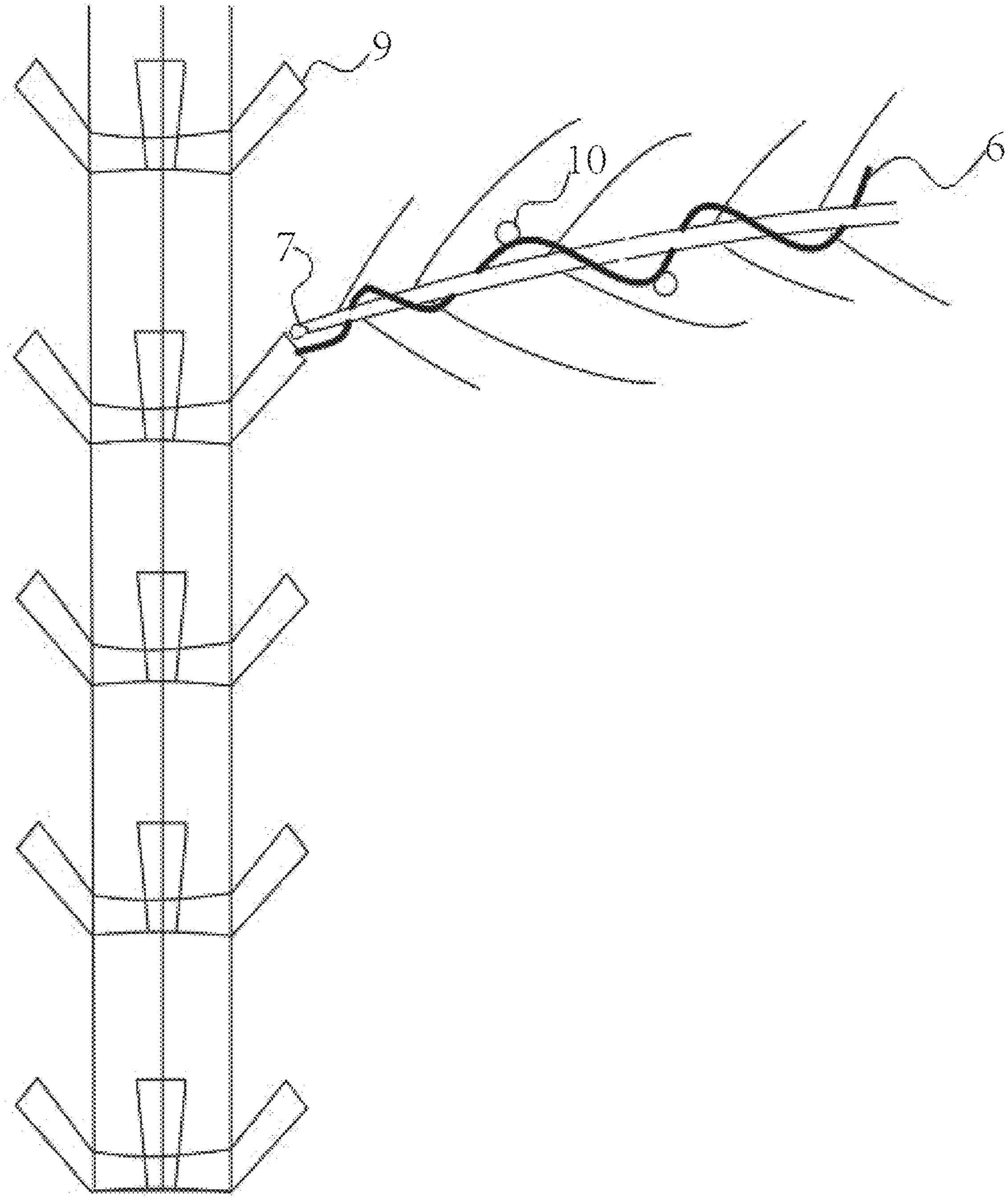
FIG. 11 is a schematic diagram of a trunk of a Christmas tree according to the present disclosure.

With reference to FIGS. 10 and 11, a trunk of the Christmas tree has many layers, and each of the layers can be inserted with a plurality of the branches 7, the branches 7 are located at a same height and are diverged to both sides, each of the layers of the trunk of the Christmas tree is provided with a plurality of sockets 9, and the sockets 9 are connected in parallel. For a traditional Christmas light string, the branches 7 are first inserted into the trunk, and a single light string 6 connected in series are then wound around the plurality of the branches 7, which makes the operation cumbersome and inefficient.

In the present disclosure, the plurality of the lamp bodies 10 are connected in series to form the light string 6, each of the branch 7 is provided with the independent light string 6, each of the independent light string 6 is wound around the single branch 7, the branch 7 is then inserted into the trunk of the Christmas tree, an end of the light string 6 is provided with a power plug 8, and the power plug 8 is connected to the socket 9, which is simple and convenient, facilitating easy installation and removal.

In addition, the power plug 8 of the light string 6 is further provided with a boost circuit 12. A safety voltage in some countries is subjected to limitation. When the light string 6 is wound around the branch 7 that is relatively large, and a large number of the lamp bodies 10 are required, a voltage needed accordingly increases and may increase the safety voltage, as the light string 6 is composed of the plurality of the lamp bodies 10 that are connected in series, in which case, the boost circuit 12 can adjust and boost the voltage properly, ensuring voltages of the lamp bodies 10 of the light string 6 is normal.

The present disclosure provides a Christmas tree snap-fit lamp body, an exterior of the lamp body 10 is mainly composed of three parts: a lampshade 1, a soft core 2, and a snap-fit shell 3, where the lampshade 1, the soft core 2, and snap-fit shell 3 are connected in sequence, the three parts are all hallow and interconnected internally, a light-emitting diode 4 is fixed inside the lampshade 1, electrode sheets 5 are fixed inside the snap-fit shell 3, the positive and negative terminals of the pins 41 of the light-emitting diode 4 are respectively connected to the electrode sheets 5, the light-emitting diode 4 and the electrode sheets 5 are enclosed with the lampshade 1, and the soft core 2, and the snap-fit shell 3 to provide protective, dustproof and waterproof effects; the flexible connecting rod 21 is arranged on an outer wall of the soft core 2, the snap-fit slot 32 is formed on the outer wall of the snap-fit shell 3, and the flexible connecting rod 21 can be bent downward and is snapped into the snap-fit slot 32, which not only enhances the connection between the flexible connecting rod 21 and the soft core 2, but also prevents the positive and negative terminals of the pins 41 of the light-emitting diode 4 from being connected in reverse to the electrode sheets 5; the polar plate 22 is arranged inside the channel of the soft core 2, the two pins 41 are separated by the polar plate 22 to avoid circuit failure caused by contact of the positive and negative terminals of the two pins 41; the fixing clamp 31 is arranged on the outer wall of the snap-fit shell 3, the fixing clamp 31 can be fixedly connected to the tree leaves of the branch 7 of the Christmas tree to improve the stability of connections between the lamp body 10 and the tree leaves; and when the plurality of the lamp bodies are connected, the fixing clamp 31 can secure each of the lamp bodies 10 in place to facilitate decoration. In summary, the present disclosure features strong connection stability and convenient assembly and disassembly of accessories.

The foregoing descriptions are merely preferred specific implementations of the present disclosure, and are not intended to limit the protection scope of the present disclosure. Any equivalent replacements or changes made by a person skilled in the art according to the technical solution of the present disclosure and the inventive concepts thereof within the technical scope disclosed in the present disclosure shall fall within the protection scope of the present disclosure.

What is claimed is:

1. A Christmas tree snap-fit lamp body, comprising a lampshade, a light-emitting diode, a soft core, and a snap-fit shell, wherein the lampshade is provided with an opening on a lower side and hollow inside, each of the soft core and the snap-fit shell is provided with a channel that penetrates through from top to bottom, a lower end of the lampshade is inserted and connected into the channel inside the soft core, a lower end of the soft core is inserted and connected into the snap-fit shell, and inner walls of both sides of the snap-fit shell are provided with electrode sheets that are respectively connected to external connecting wires; the light-emitting diode is placed inside the lampshade, pins of the light-emitting diode pass through the lower side of the lampshade and through the channel inside the soft core to be connected to the electrode sheets, a polar plate is arranged inside the channel of the soft core, the two pins of the light-emitting diode are separated by the polar plate to avoid circuit failure caused by contact with the two pins, a fixing clamp is arranged on an outer wall of the snap-fit shell, and the fixing clamp can be fixed to tree leaves of a branch of a Christmas tree to improve the stability of connections between the lamp body and the tree leaves;

wherein a soft connection wall and a shoulder are arranged at the lower end of the soft core;

wherein a soft connection groove and a recess corresponding to the soft connection wall and the shoulder are arranged in the channel inside the snap-fit shell;

wherein a flexible connecting rod is arranged on an outer wall of the soft core;

wherein a snap-fit slot is formed on the outer wall of the snap-fit shell; and when the soft connection wall is inserted into the soft connection groove to a predetermined depth, the flexible connecting rod is bent downward and is snapped into the snap-fit slot.

2. The Christmas tree snap-fit lamp body according to claim 1, wherein an outer wall of a bottom end of the lampshade is provided with a first protruding ring, and a second protruding ring corresponding to the first protruding ring is arranged on an inner wall of the channel inside the soft core; and when the lower end of the lampshade is inserted into the first protruding ring, the first protruding ring and the second protruding ring form a limiting snap-fit connection to prevent the lampshade from detaching from the soft core.

3. The Christmas tree snap-fit lamp body according to claim 1, wherein the shoulder is located at an upper end of the soft connection wall.

4. The Christmas tree snap-fit lamp body according to claim 3, wherein when the soft connection wall is inserted into the soft connection groove and downward to a predetermined depth, the shoulder is in contact with the recess, limiting an insertion depth of the soft core into the channel inside the snap-fit shell.

5. The Christmas tree snap-fit lamp body according to claim 4, wherein when the soft connection wall is inserted into the soft connection groove, and the shoulder is in contact with the recess, the two pins are respectively connected to the electrode sheets on the inner walls of both sides of the snap-fit shell.

6. The Christmas tree snap-fit lamp body according to claim 5, wherein a slot is formed on each of the inner walls of the snap-fit shell, the slots and the soft connection groove are arranged alternately on the inner walls of the snap-fit shell, the electrode sheets are inserted from a lower side of the snap-fit shell and pass through the channel inside the snap-fit shell, and then pulled down along the inner walls of the snap-fit shell to be snapped into the slots, the electrode sheets are fixed to the slots, and the pins of the light-emitting diode pass through a perforation of the soft core, and are tightly fitted against the electrode sheets under the pressure of the inner walls of the slots and the shoulder.

7. The Christmas tree snap-fit lamp body according to claim 4, wherein the flexible connecting rod can be bent and rotated.

8. The Christmas tree snap-fit lamp body according to claim 1, wherein the lampshade is made from transparent material; and when the light-emitting diode inside the lampshade is lighted up, external surroundings can be accordingly illuminated via the lampshade.

9. The Christmas tree snap-fit lamp body according to claim 1, wherein a number of the electrode sheets is two, which are respectively connected to the external connecting wires, such that a plurality of the lamp bodies are connected to form a light string.

10. The Christmas tree snap-fit lamp body according to claim 9, wherein the light string is composed of the plurality of the lamp bodies that are connected in series, an end of the light string is provided with a power plug, a main body of the Christmas tree is provided with a plurality of sockets that are connected in parallel, and each of the sockets is connected to the power plug.

11. The Christmas tree snap-fit lamp body according to claim 10, wherein the power plug of the light string is further provided with a boost circuit, and the boost circuit can boost a voltage to make voltages of the lamp bodies of the light string normal.

* * * * *